Patented May 25, 1926.

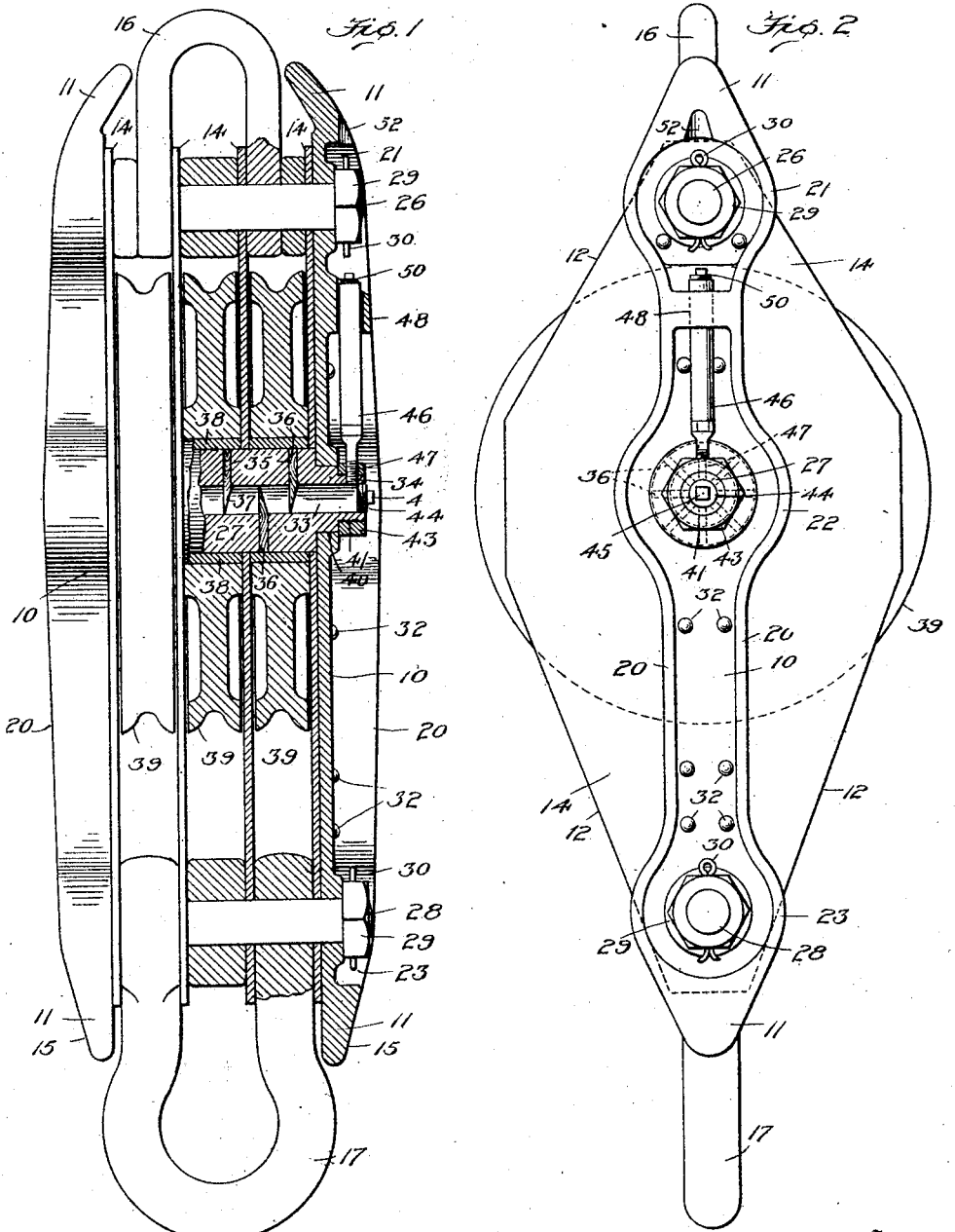

1,586,272

UNITED STATES PATENT OFFICE.

WALTER G. VREELAND, OF HOUSTON, TEXAS, ASSIGNOR TO LUCEY MANUFACTURING CORPORATION, OF CHATTANOOGA, TENNESSEE, A CORPORATION OF TENNESSEE.

TRAVELING BLOCK.

Application filed June 12, 1923. Serial No. 644,973.

This invention relates to a traveling block particularly designed for use in connection with well drilling apparatus.

The principal object of the present invention is to provide a self-lubricating traveling block of sturdy construction and in which provision is made for protecting the lubricating system by the same means that prevents the block as a whole from being caught in any projections that might be present in the derrick.

A further object of the invention lies in the provision of an auxiliary oil reservoir serving the dual function of a filler pipe for the main reservoir and a means for locking the nut on the center bearing pin for the sheaves or pulley wheels. A still further object of the present invention lies in the provision of simple and efficient means for providing a constant flow of oil to the brass bushings which are pressed into the sheaves. Under the last mentioned object of the present invention are included a number of details more particularly pointed out in the claims.

In the drawings,—

Figure 1 is a side elevation partly in section showing my invention as applied to a three-sheave, sixty-inch traveling block.

Fig. 2 is a front elevation thereof.

The general formation of the traveling block including the frame, the becket pins and the bails, are of the general type common in oil well construction, the main points of difference lying in the lubrication features and in the side bars 10 for protecting certain parts of the lubrication system from injury. Each of the side bars 10 is an elongated channel having rounded, solid ends 11 extending beyond the tapering edges 12 of the side plates 14 and at the same time the ends 11 are tapered inward as at 15 substantially tangent to the curves of the bails 16 and 17 whereby a rounded or sloping surface is presented to any projection that might be found in the oil field derrick so that as the block is raised or lowered there will be no danger of the block being caught.

The protecting ribs 20 of the side bars 10 are of considerable height almost equaling the distance between the ribs between adjacent pins. The ribs 20 are curved as at 21, 22 and 23 to afford space for convenient manipulation of the nuts on the upper becket pin 26, the center bearing pin 27 and the lower becket pin 28 respectively, the becket pins and their nuts 29 being of the usual type locked in place by means of ordinary cotter pins 30. Each of the side bars 10 are permanently secured to the adjacent side plate such as 14 by any preferred fastening as for example the rivets 32 so that the side bars materially reinforce the side plates.

The center bearing pin 27 has a central bore 33 serving as an oil reservoir and communicating with a plurality of radial holes 35 in which are driven wooden pins or wicks 36 tapered at their ends 37 where they project into the center bore, the purpose of such tapering being to expose the entire grain of the wood to facilitate the capillary action of the wicks which draw oil from the main reservoir and deliver it to the brass bushings 38 which are pressed into the sheaves 39 in the customary fashion.

The diameter of the center pin is reduced as at 40 where it passes through the side bar 10 and again at 41 the latter being threaded to receive the nut 43 which prevents rotation of the center pin with respect to the side bars. I find it preferable to close the main oil reservoir by a threaded plug such as 44 having a square projecting lug 45 for convenient manipulation in inserting and removing this closure member.

The center bearing pin 27 has a radial bore 47 communicating with the center oil reservoir 33 and being tapped to receive the threaded nipple of an oil filler pipe 46 which substantially fits the smooth radial bore 47 in the lock nut 43 and also a similar but larger bore in the transverse lug 48 which joins the two side ribs of the side bar 10. The oil filler pipe 46 forms in effect an auxiliary reservoir and may be closed at its upper end by any preferred closure such as the plug 50. As is clearly shown in the drawings the oil filler pipe or auxiliary reservoir extends vertically upward from the center bearing pin and since it is preferably over a foot long it furnishes a head of oil providing sufficient pressure so that the oil will readily flow upward through the wooden pins or wicks 36 more readily than if capillary attraction alone were relied on.

Since the auxiliary reservoir 46 is rather snugly mounted in the cylindrical hole in the lug 48 and is rigidly secured to the center bearing pin 27 it very effectively locks the nut 43 against turning. The small recess 52 noted in the upper end 11 of the side bar is for the purpose of facilitating the removal of the oil filler pipe which obviously cannot be removed until the nut 29 on the upper becket pin 26 is removed and the becket pin itself moved to the left as shown in Fig. 1.

What I claim is:—

1. A traveling block of the type employing a center bearing pin bored to form an oil reservoir characterized by the provision of a closure for said reservoir a nut on said bearing pin surrounding one end of said reservoir for holding said pin against rotation, said nut having a radial opening therein, an auxiliary oil reservoir fitting said radial opening in said nut and preventing turning of said nut, and means engaging said auxiliary oil reservoir at a distance from said nut.

2. In a traveling block the combination of a sheave supporting center bearing pin bored to provide an oil reservoir side bars for said block a nut on said pin surrounding one end of said reservoir, an auxiliary reservoir formed separately from said nut, said auxiliary reservoir passing through said nut and supported vertically by said pin, and means formed integrally with said side bars for loosely receiving the free end of said auxiliary reservoir.

3. In a traveling block, a plurality of sheaves, a bushing on each sheave, a hollow center bearing pin for all of said sheaves, a plurality of plates on said hollow bearing pin separating said sheaves, a plurality of wicks radially disposed within said hollow bearing pin and extending into the central bore thereof, a plurality of becket pins, a nut on each of said pins, and a side bar secured to each of the outer plates to reinforce the same, and ribs on each of said side bars extending beyond said nuts.

4. In a traveling block, a plurality of sheaves, a bushing on each sheave, a hollow center bearing pin for all of said sheaves, a plurality of plates on said hollow bearing pin separating said sheaves, a plurality of wicks radially disposed within said hollow bearing pin and extending into the central bore thereof, a plurality of becket pins, a nut on each of said pins, a side bar secured to each of the outer plates to reinforce the same, ribs on each of said side bars extending beyond said nuts, a vertically disposed auxiliary oil reservoir, and a lug on one of said side bars supporting the upper end of said reservoir.

WALTER G. VREELAND.